(12) United States Patent
Fischi

(10) Patent No.: US 7,924,410 B2
(45) Date of Patent: Apr. 12, 2011

(54) APPARATUS AND METHOD FOR SCALABLE PHASED ARRAY RADAR DATA DISTRIBUTION AND BEAMFORMING

(75) Inventor: Jonathan Fischi, Fayetteville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 168 days.

(21) Appl. No.: 12/246,047

(22) Filed: Oct. 6, 2008

(65) Prior Publication Data

US 2010/0085245 A1    Apr. 8, 2010

(51) Int. Cl.
*G01C 3/08* (2006.01)
(52) U.S. Cl. ...................... 356/5.11; 356/4.01
(58) Field of Classification Search .............. 342/92, 342/195, 200; 356/4.01, 5.11
See application file for complete search history.

(56) References Cited

U.S. PATENT DOCUMENTS

| | | | |
|---|---|---|---|
| 5,247,310 A | 9/1993 | Waters | |
| 5,426,437 A | 6/1995 | Cross et al. | |
| 7,265,712 B2 * | 9/2007 | Merkel et al. | 342/195 |
| 7,342,950 B1 | 3/2008 | Mason et al. | |
| 2005/0084031 A1 | 4/2005 | Rosen et al. | |
| 2007/0129040 A1 | 6/2007 | Adlerstein et al. | |
| 2007/0280704 A1 | 12/2007 | Fitzgerald et al. | |

OTHER PUBLICATIONS

International Search report dated Jan. 13, 2010 for related PCT application No. PCT/US2009/059680.

* cited by examiner

*Primary Examiner* — Isam Alsomiri
(74) *Attorney, Agent, or Firm* — Howard IP Law Group, PC

(57) ABSTRACT

A radar array antenna comprising: a plurality of analog to digital (A/D) converters for converting analog signals from the array to digital signals, the signals supplying input to one or more optical modulators having controllable wavelengths, each optical modulator connected to a corresponding multiplexer, the multiplexer providing outputs to a demultiplexer that distributes the signals to a beamformer.

20 Claims, 10 Drawing Sheets

APPARATUS AND METHOD FOR SCALABLE PHASED ARRAY RADAR DATA DISTRIBUTION AND BEAMFORMING

FIELD OF INVENTION

The present invention relates to a phased array radar analog to digital (A/D) signal distribution process and apparatus using tunable lasers and multiplexers.

BACKGROUND OF THE INVENTION

New radar system requirements increasingly push designers to implement digital beamforming techniques. Pursuant to that initiative, array designs are evolving to on-array element level analog to digital conversion ("A/D"). Current beamforming designs provide that output data is taken off the array for subsequent processing (including A/D conversion) via high-speed data connections. Consequently, high frequency, high bandwidth radars can have hundreds of high-speed radar data lines connecting the array to the A/D processors and beamformers.

SUMMARY OF THE INVENTION

A radar array antenna comprising: a plurality of analog to digital (A/D) converters for converting analog signals from the array to digital signals, the signals supplying input to one or more optical modulators having controllable wavelengths, each optical modulator connected to a corresponding multiplexer, the multiplexer providing outputs to a demultiplexer that distributes the signals to a beamformer.

The invention herein also relates to a process for receiving a plurality of radar signals; producing a plurality of corresponding digital signals; modulating a tunable laser using the digital signals to produce a modulated optical signal at one or more associated wavelengths; transmitting the modulated optical signal over a fiber optic transmission channel; optically multiplexing the modulated optical signal; transmitting the multiplexed modulated optical signal to an optical demultiplexer; demultiplexing the optical signal and converting the signal to a digital signal; and beamforming using the digital signal representing the received radar signal.

The invention further relates to a radar array antenna apparatus comprising: a plurality of (A/D) converters for converting analog signals indicative of radar return data from the array to digital signals; one or more optical modulators coupled to the A/D converters for receiving the digital signals, the optical modulators having controllable wavelengths; wherein each optical modulator is connected to a multiplexer, the multiplexer providing outputs via a corresponding optical medium to a corresponding demultiplexer that distributes the signals to a beamformer.

The invention further relates to a method for receiving analog signals output from antenna elements constituting an antenna array and processing the analog signal to obtain beamformed data, the method comprising: receiving in the array a plurality of analog radar signals; converting in the array the analog radar signals to corresponding digital signals; modulating in the array a tunable laser outputting a waveform at one or more selected wavelengths using the digital signals to produce a modulated optical signal at the one or more selected wavelengths; transmitting the modulated optical signal over a fiber optic transmission channel; optically multiplexing the modulated optical signal; transmitting the multiplexed modulated optical signal over a fiber optic transmission channel to an optical demultiplexer; demultiplexing the optical signal and converting the signal to a digital signal; and beamforming using the digital signal representing the received radar signal to obtain beamformed data.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts and.

DETAILED DESCRIPTION OF THE PREFERRED EMBODIMENTS

Figure 1:
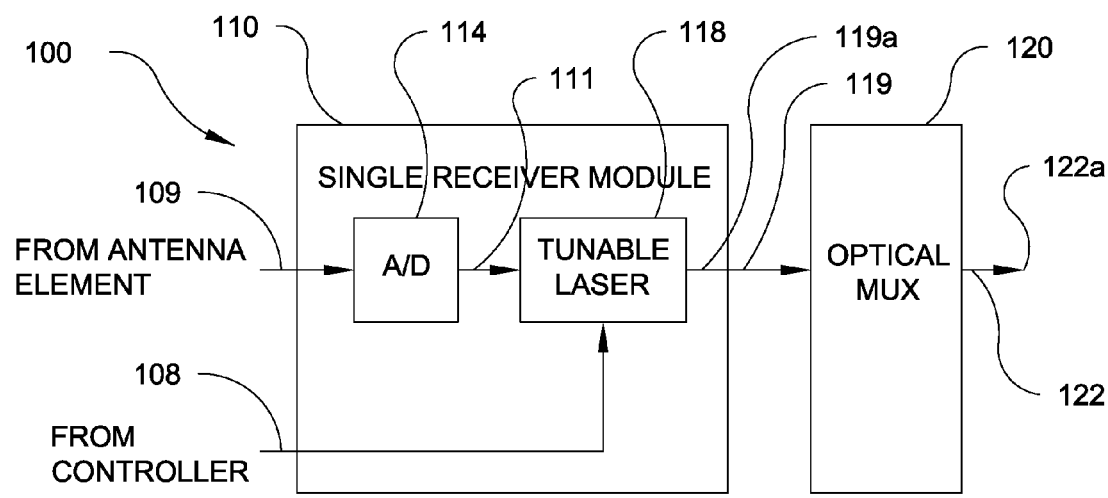
FIG. 1 illustrates a single receiver module according to an embodiment of the invention.

The following description of the preferred embodiments is merely by way of example and is not intended to limit the invention or its application. FIG. 1 illustrates an apparatus 100 according to an embodiment of the invention. An analog signal 109 from a phased array antenna module (not shown) and indicative of return radar data is received by a single receiver module 110 located on the antenna array. The analog signal represented generally as 109 feeds an A/D converter 114 that produces a corresponding digital signal 111 that feeds a tunable laser 118. The sampling rate of the A/D converter may be adjusted in accordance with system and application requirements. The tunable laser is tuned to produce a modulated laser signal 119a modulating the digital signal data stream 111 at a wavelength determined by a tuning control signal 108. The modulated optical signal 119a is passed at the tuned wavelength over a fiber optic transmission channel 119 to an optical multiplexer 120. The optical multiplexer 120 provides a multiplexed signal 122a to a demultiplexer processor (not shown) over transmission line 122 such as one or more optical fibers. In an exemplary configuration, Multiplex, Inc. of South Plainfield, N.J. produces an electronically tuned laser and transmitter that modulates a 10 Gb/s on a 1550 nm carrier useful for implementing the present invention. The product is available in 4 to 16 channels (100 GHz) and 4 to 32 channels (50 GHz) in C band wavelengths.

Figure 2:
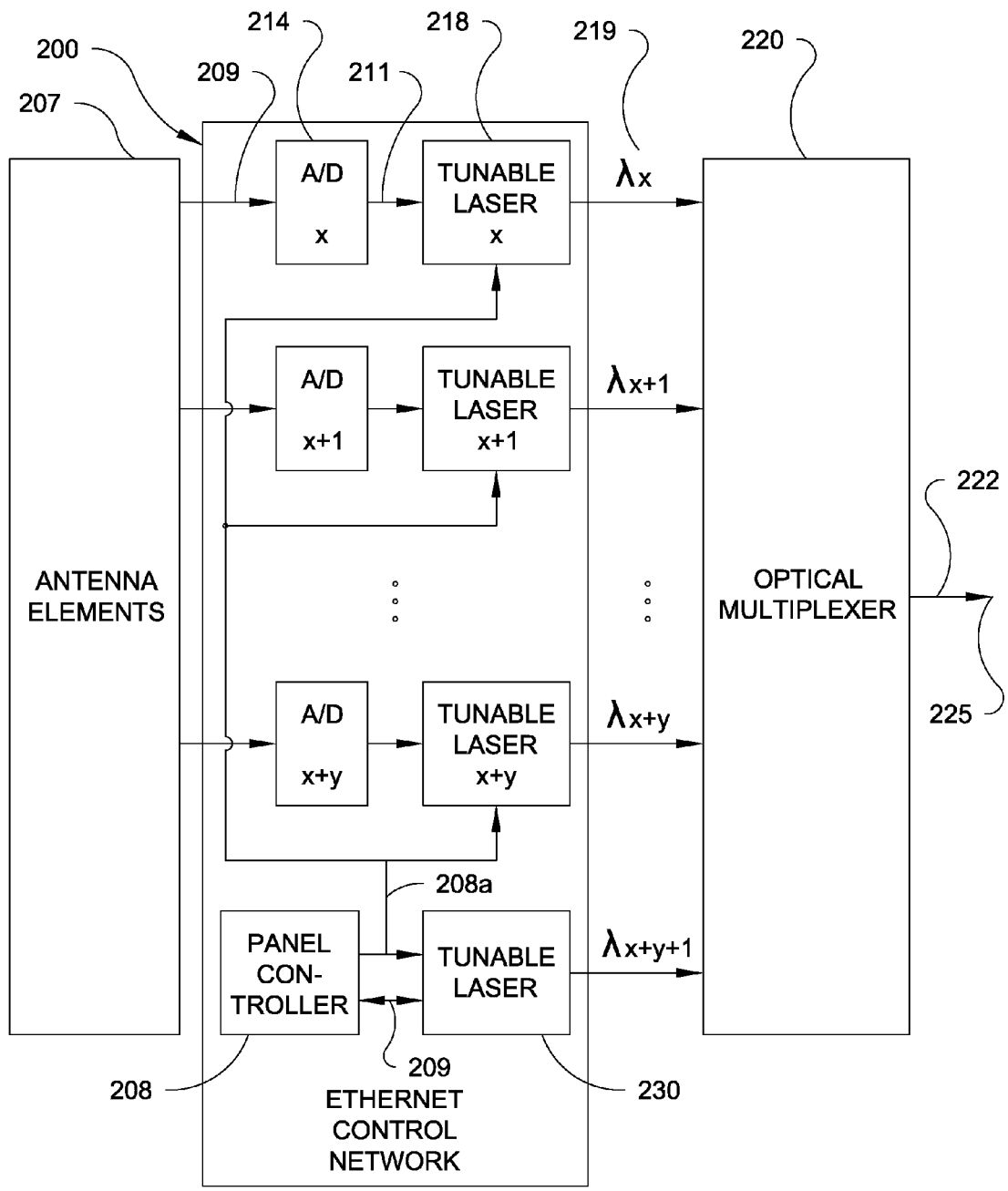
FIG. 2 illustrates a receiver panel grouping according to an embodiment of the invention.

FIG. 2 illustrates a receiver A/D module panel grouping subsystem 200 located on the antenna array according to an embodiment of the invention. A plurality of analog radar signals from the antenna elements of the antenna array and represented generally as 209 are received at A/D panel grouping subsystem 200 by a plurality of A/D converters $214_x$ through $214_{x+y}$ from array antenna receiver electronics module 207. The A/D converters $214_x$ through $214_{x+y}$ produce corresponding digital signals $211_x$ through $211_{x+y}$ that feed one or more associated tunable lasers $218_x$ through $218_{x+y}$. The tunable lasers $218_x$ through $218_{x+y}$ produce modulated laser outputs at a wavelength determined by a controller signal 208a as conditioned by panel controller module 208. The tunable lasers $218_x$ through $218_{x+y}$ are modulated by the digital signals $211_x$ through $211_{x+y}$. The output of the receiver A/D panel grouping subsystem 200 consists of each of the digital signals carried at different wavelengths. The corresponding signals at the tuned wavelengths $\lambda_x$ through $\lambda_{x+y}$ are conveyed over one or more associated fiber optic transmission channels $219_x$ through $219_{x+y}$ to an optical multiplexer 220. The optical multiplexer 220 passes a multiplexed optical signal 225 over optical transmission line 222 to a demultiplexer processor (not shown) located off of the array. A panel controller 208 sets the wavelengths for transmission for each of the tunable lasers. A separate tunable laser 230 produces an array Ethernet control signal $\lambda_{x+y+1}$ containing control data 209 used for array/control communications that is multiplexed with the optical radar data signals.

Figure 3:
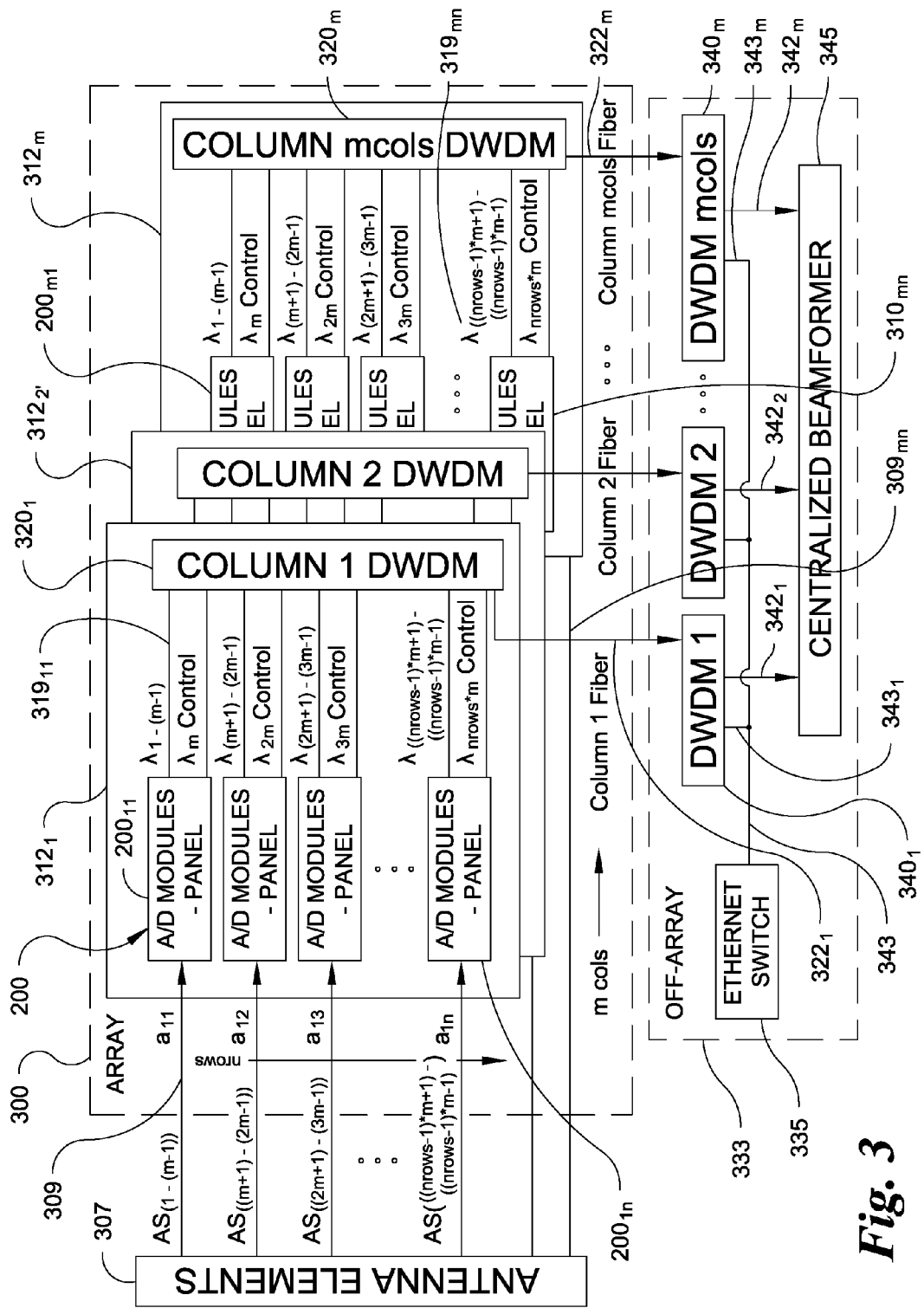
FIG. 3 illustrates an array panel grouping with a controllable optical multiplexer according to an embodiment of the invention.

FIG. 3 illustrates a more detailed representation of an array architecture 300 for performing "on array" A/D conversion of analog radar antenna data through a series of receiver A/D panel grouping subsystems arranged so as to obtain row data for a given column multiplexed together over a single optical fiber and applied to an off-array demultiplexer (one for each column of array data) for demultiplexing and application to a centralized beamformer. It is of course understood that the architecture may be adapted so as to interchange the row/column data for multiplexing and transmission to the off-array processing module (333 in FIG. 3). It is further understood that, depending on the size of the array, only a single fiber for off-array transmission of the row/column radar array data may be necessary.

As shown in FIG. 3 an array architecture 300 comprises: panels $312_1$ through $312_m$ where each panel comprises a series of receiver A/D panel grouping subsystems such as described in FIG. 2, for converting analog signals present on lines such as $309a_{11}$ through $309a_{1n}$ to digital signals. The digital signals supply input to one or more optical modulators embodied as tunable lasers having controllable wavelengths, wherein the tunable lasers in each A/D module panel 200 are connected to a corresponding multiplexer such as multiplexers $320_1$ through $320_m$. The multiplexers provide inputs for a demultiplexer $340_1$ through $340_m$, that distributes the signals to a beamformer 345 and Ethernet control data to Ethernet data switch 335 to provide control for the array and antenna.

By way of further explanation, FIG. 3 illustrates an architecture of m panels 312 (and designated as $312_1$ through $312_m$) Each panel comprises a plurality (e.g. "m") of A/D module grouping subsystem panels 200 (and designated as $200_1$ through $200_n$ for a given panel $312_1$) as detailed in FIG. 2 and including arrangements of A/D modules and tunable lasers as designated $200_{11}$ through $200_{mn}$. In operation, a plurality of analog signals $309a_{11}$ through $309a_{mn}$ is received from antenna receiver electronics system 307 and converted into corresponding waves at tuned wavelengths $\lambda_{1-(m-1)}$ through $\lambda_{((n-1)*(m+1))-((n-1*(m-1))}$ and passed over fiber optic transmission channels $319_{11}$ through $319_{mn}$ to corresponding column multiplexers DWDM $320_1$ through DWDM $320_m$. In the exemplary embodiment, each of the multiplexers DWDM $320_1$ through DWDM $320_m$ is adapted to multiplex a column of digital data representing a portion of the received array antenna data out to a corresponding column fiber transmission line ($322_1$ through $322_m$). Each column fiber is fed to a remote (i.e. off array) module 333 comprised of corresponding demultiplexer processors DWDM $340_1$ through DWDM $340_m$. Each demultiplexer indicated generally as 340 receives corresponding multiplexed column data via a corresponding column optical fiber 322 and provides digital demultiplexed data 342 to central beamformer 345. As discussed above, each A/D panel grouping subsystem module $200_{nm}$ contains a separate tunable laser (see FIG. 2). Ethernet switch 335 receives the corresponding array control information 343 (and labeled as lambda nm control and output from each A/D modules panel 200) conveyed via each of the column fibers 322 and demultiplexed via DWDM 340, through DWDM $340_{nm}$, and passes control between the array/antenna and central radar control computer. By way of example and not limitation, Kylia located in Paris, France provides a DWDM Mux/Demux as might be employed to achieve the functionality for DWDM $320_1$ through DWDM $320_m$ and DWDM $340_1$ through DWDM $340_m$. The Kylia DWDM Mux/Demux achieves transfer rates from 12.5 to 200 GHZ at a given starting frequency.

Figure 4:
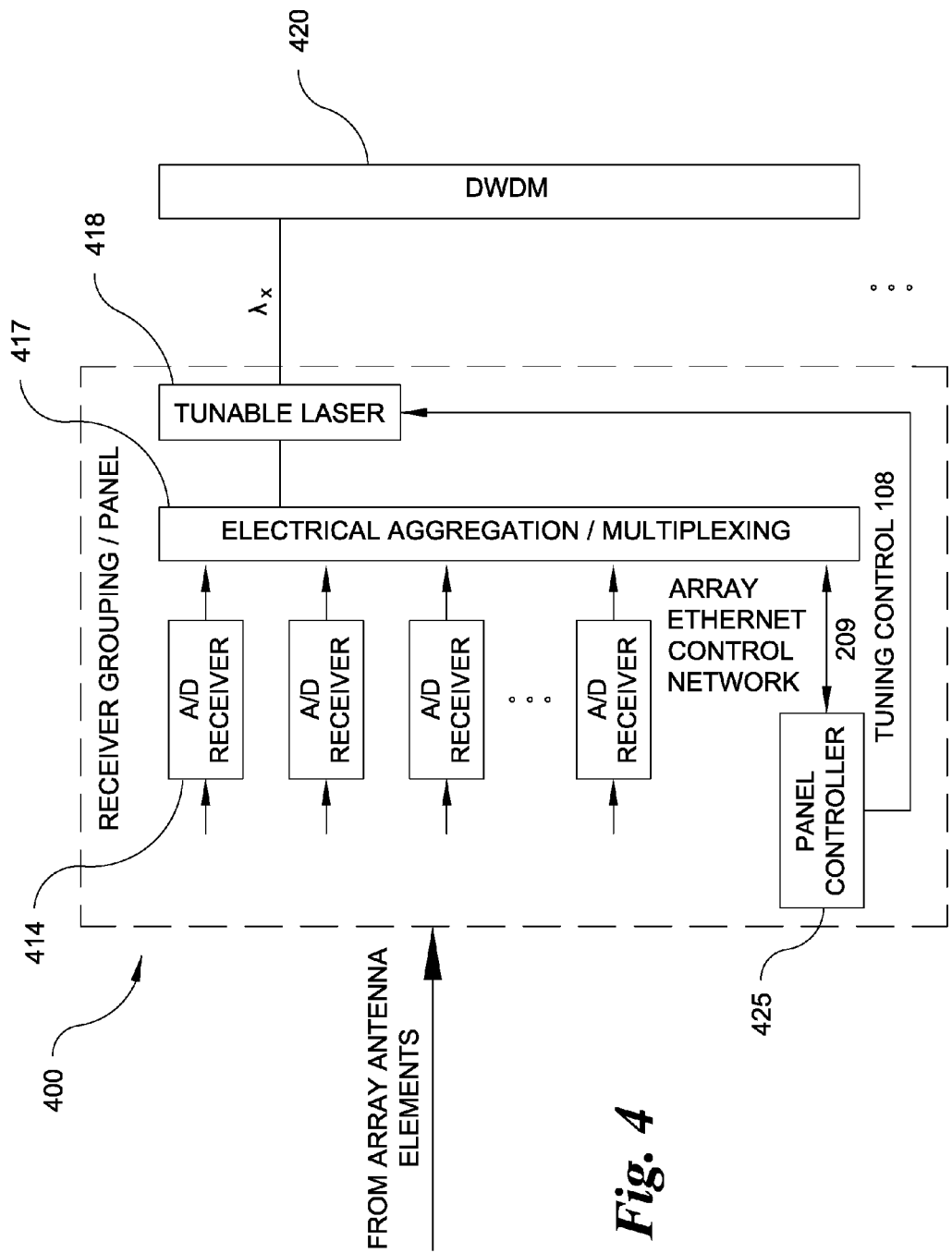
FIG. 4 illustrates a panel of receiver modules according to an embodiment of the invention.
Figure 5:
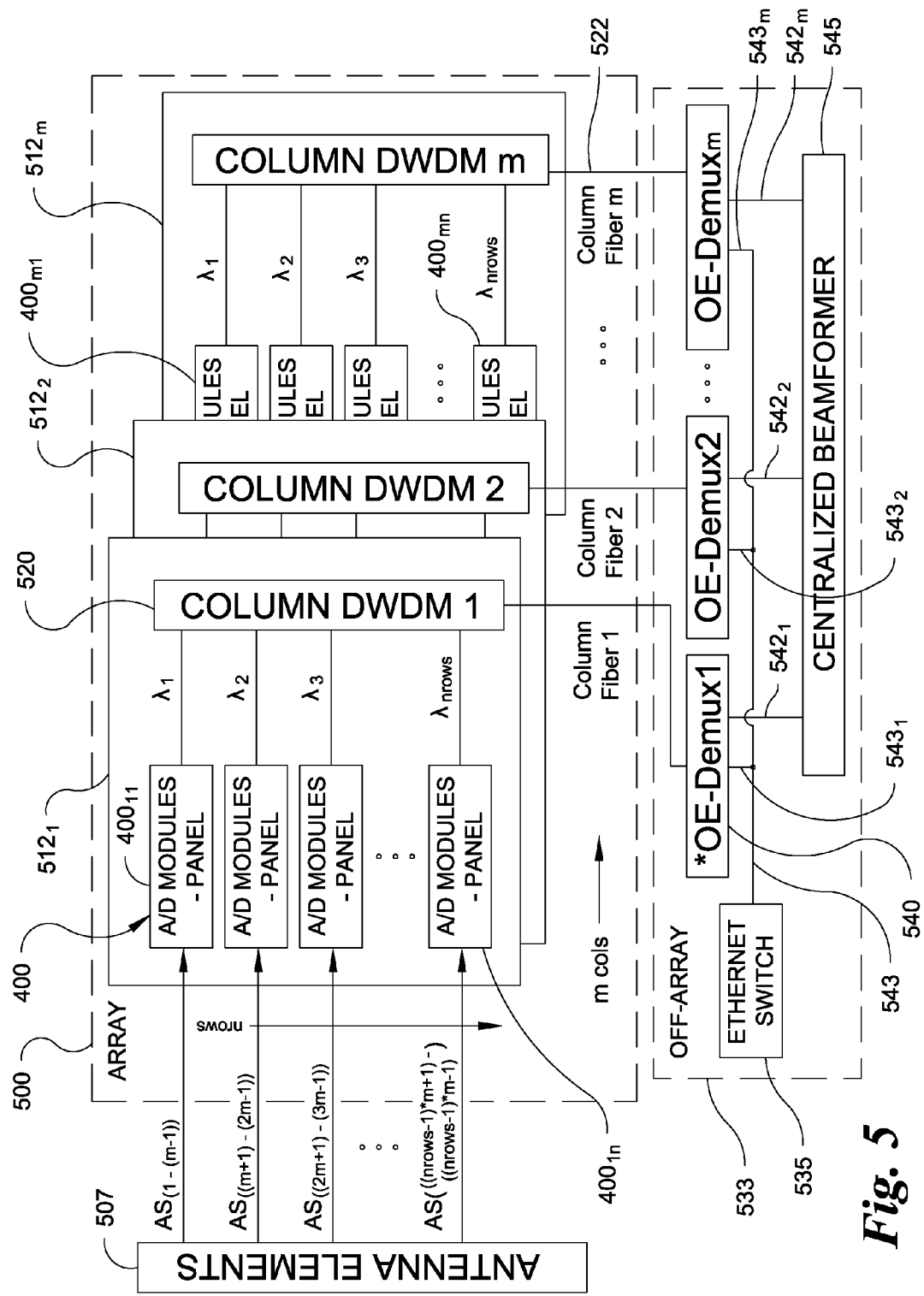
FIG. 5 illustrates electrical aggregation multiplexing and dense wavelength division multiplexing according to an embodiment of the invention.

FIG. 4 illustrates a panel A/D grouping subsystem 400 of A/D receiver modules 414 according to an embodiment of the invention. Under control provided by panel controller 425 an electrical aggregation/multiplexer 417 combines the digitally converted A/D receiver 414 signals from an antenna processor (See FIG. 3, 307). The combined or multiplexed signals from electrical aggregation/multiplexer 417 serve as input to a tunable laser 418. The inventor has found, by way of example and not limitation, that Multiplex, Inc. of South Plainfield, N.J. electronically tunable laser and transmitter product described in connection with FIG. 2 carries out the functionality required for the tunable laser 418. The output of the laser feeds a DWDM 420. Tunable laser 418 receives a tuning control signal 108 for tuning to the selected wavelength $\lambda_x$. Array control signal data 209 for controlling the array processing functionality is also applied to electrical aggregation multiplexer 417 for inclusion in the transmitted optical data stream at the selected wavelength $\lambda_x$ FIG. 5 illustrates an architecture 500 for electrical aggregation multiplexing and dense wavelength division multiplexing according to an embodiment of the invention utilizing the panel grouping subsystem 400 of FIG. 4. The architecture 500 is comprised of m columns of panels $512_1$ through $512_m$ that receive antenna 507 input and perform functionally equivalent to the panel 400 and associated DWMD 420 as described in connection with FIG. 4. Associated column DWDMs 520 designated column $DWDM_1$ through column $DWDM_m$ receive inputs from the outputs $\lambda_1$ through $\lambda_{nrows}$ of the tunable lasers (see FIG. 4, 418). Outputs from the respective column multiplexers 520 ($DWDM_1$ through column $DWDM_m$) transmit via a corresponding column fiber $522_1$ through $522_m$ to an off array processing module 533 comprised of corresponding opto-electronic demultiplexers 540 designated OE-$Demux_1$ through OE-$Demux_m$, whose outputs $542_1$ through $542_m$ provide input to a centralized beamformer 545. Ethernet switch 535 receives the corresponding control data 543 and controls processing between the array/antenna and the central radar control computer (not shown).

Figure 6:
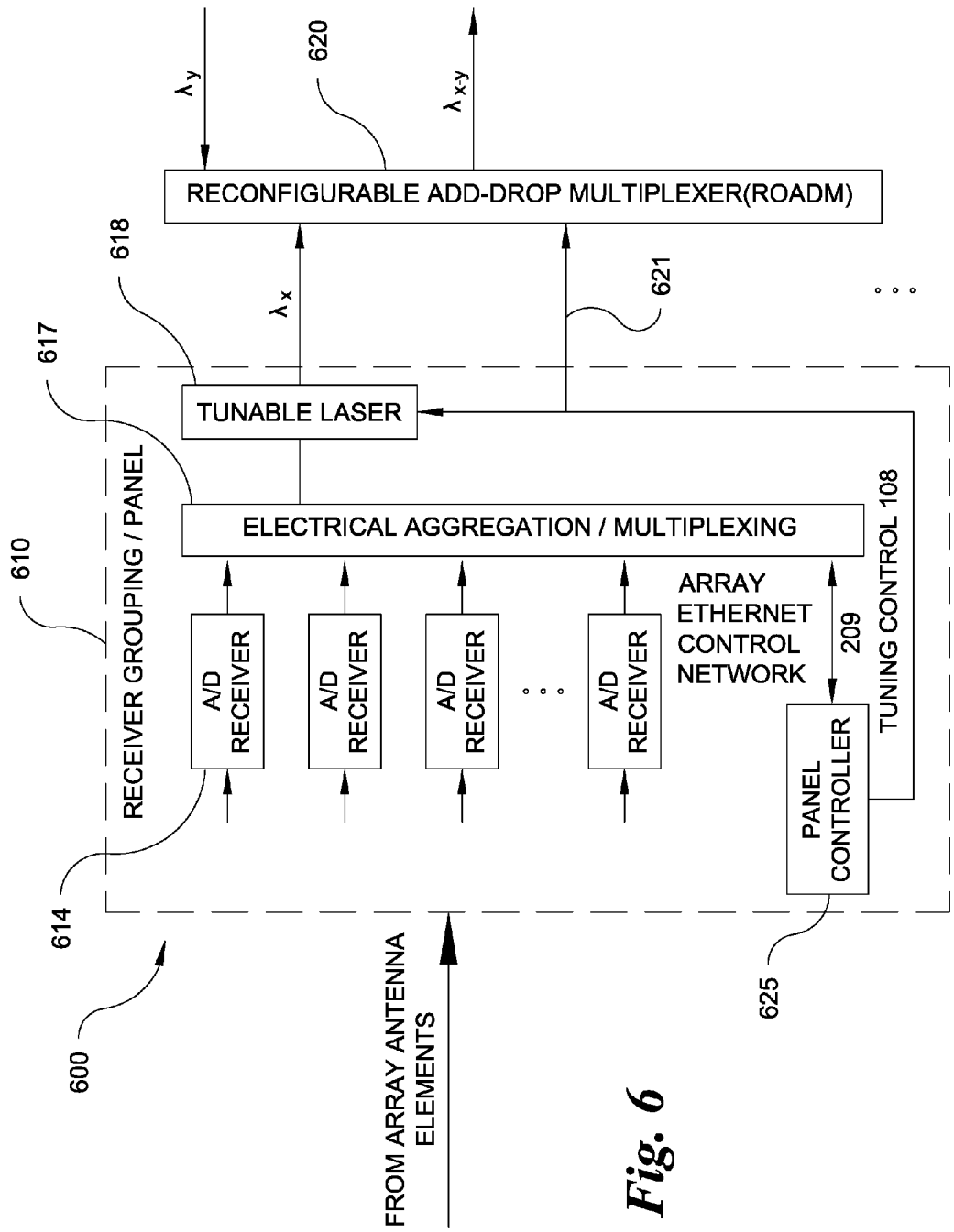
FIG. 6 illustrates an electrical aggregation multiplexing and reconfigurable add/drop multiplexer according to an embodiment of the invention.

FIG. 6 illustrates a panel receiver A/D grouping subsystem 600 of receiver modules 614 according to an embodiment of the invention. An electrical aggregation/multiplexer 617 combines the digitally converted A/D receiver 614 signals from an antenna panel/array control signal and, with the exception of a reconfigurable add/drop multiplexer 620, operates substantially equivalent to the apparatus described in connection with FIG. 4. The combined or multiplexed signals from electrical aggregation multiplexer 617 serve as input to a tunable laser 618. The output of the laser feeds the reconfigurable add/drop multiplexer 620 alternately referred to as ROADM 620. ROADM 620 further receives a tuning control signal 621 that sets the wavelength of the input $\lambda_x$ from the tunable laser 618. By way of example and not limitation, a suitable ROADM is supplied by Optoplex, Fremont, Calif. The device receives an optical signal of programmable wavelength and adds it to the already (potentially) streaming data on the fiber at the wavelength specified by the tuning control signal so as to provide output at the appropriate wavelength slot indicated as $\lambda_{x-y}$. Each single ROADM device is optimized to cover either C-, L- or both wavelengths.

Figure 7:
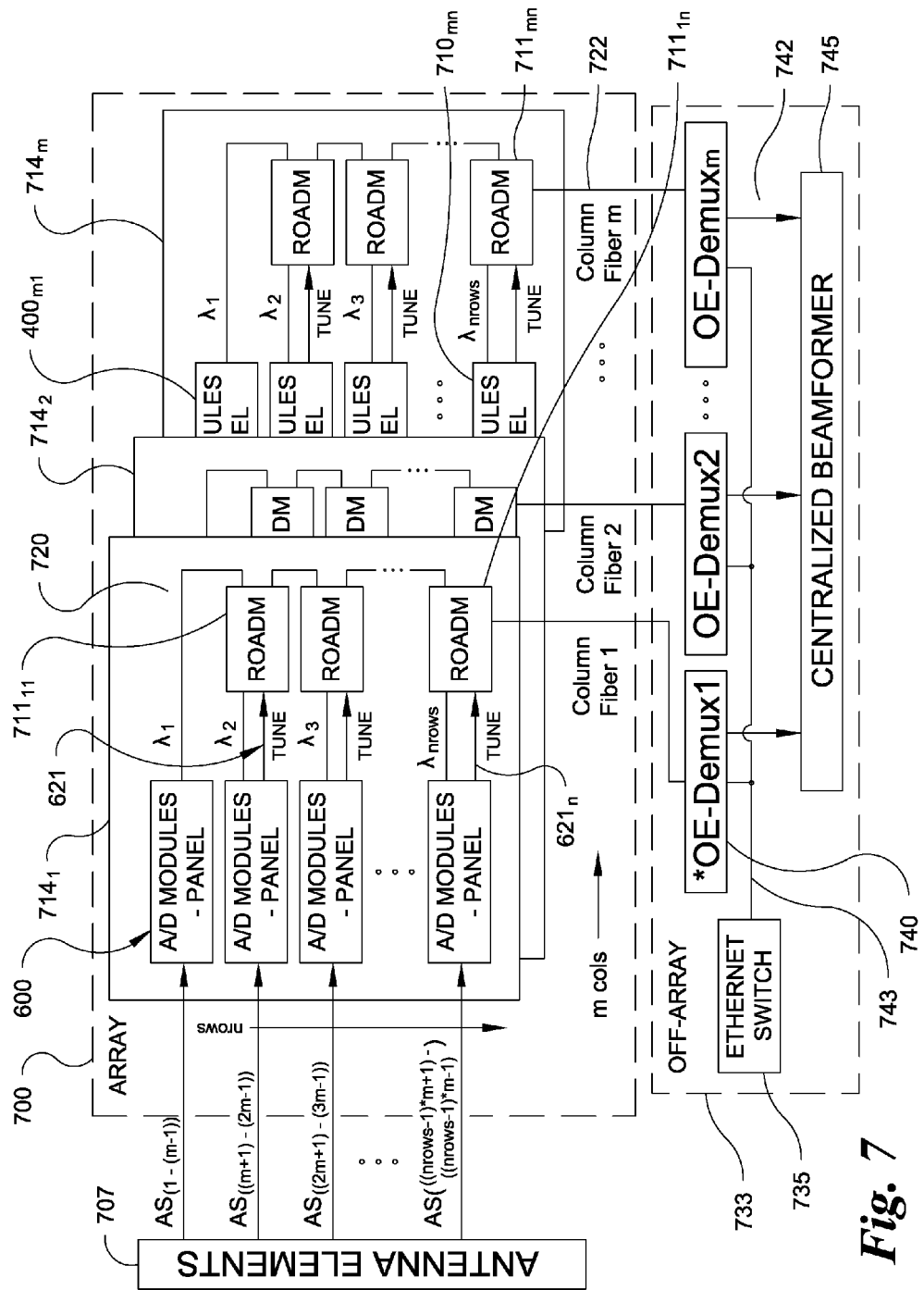
FIG. 7 illustrates an electrical aggregation multiplexing and reconfigurable add/drop multiplexer according to an embodiment of the invention.

FIG. 7 illustrates an architecture 700 for electrical aggregation multiplexing and dense wavelength division multiplexing according to an embodiment of the invention utilizing the panel grouping subsystem 600 of FIG. 6. The apparatus 700 is comprised of m columns of panels $\mathbf{714}_1$ through $\mathbf{714}_m$ that receive antenna processor 707 input. Each A/D module $\mathbf{710}_{11}$ through $\mathbf{710}_{mn}$ performs functionally equivalent to the panel 600 and associated ROADM 620 described in connection with FIG. 6. Associated ROADMs $\mathbf{711}_{mn}$ receive inputs from outputs of tunable lasers $\lambda_n$ through $\lambda_{nrows}$ (see FIG. 6, 618). Each ROADM 711 receives a tuning signal 621 locking it into the wavelength of the associated tuned lasers $\lambda_n$ through $\lambda_{nrows}$. Multiplexed outputs from the respective $n^{th}$ ROADM in each column m are transmitted to an off array processing module 733 comprised of columns of corresponding opto-electronic demultiplexers 740 designated OE-Demux$_1$ through OE-Demux$_m$ (where, m designates the number of columns) over fiber transmission line 722 designated column fiber$_1$ through column fiber$_m$ to whose outputs $\mathbf{742}_1$ through $\mathbf{742}_m$ provide input to a centralized beamformer 745. Ethernet switch 735 receives the corresponding control data 743 and controls processing between the array/antenna and the central radar control computer (not shown).

Figure 8:
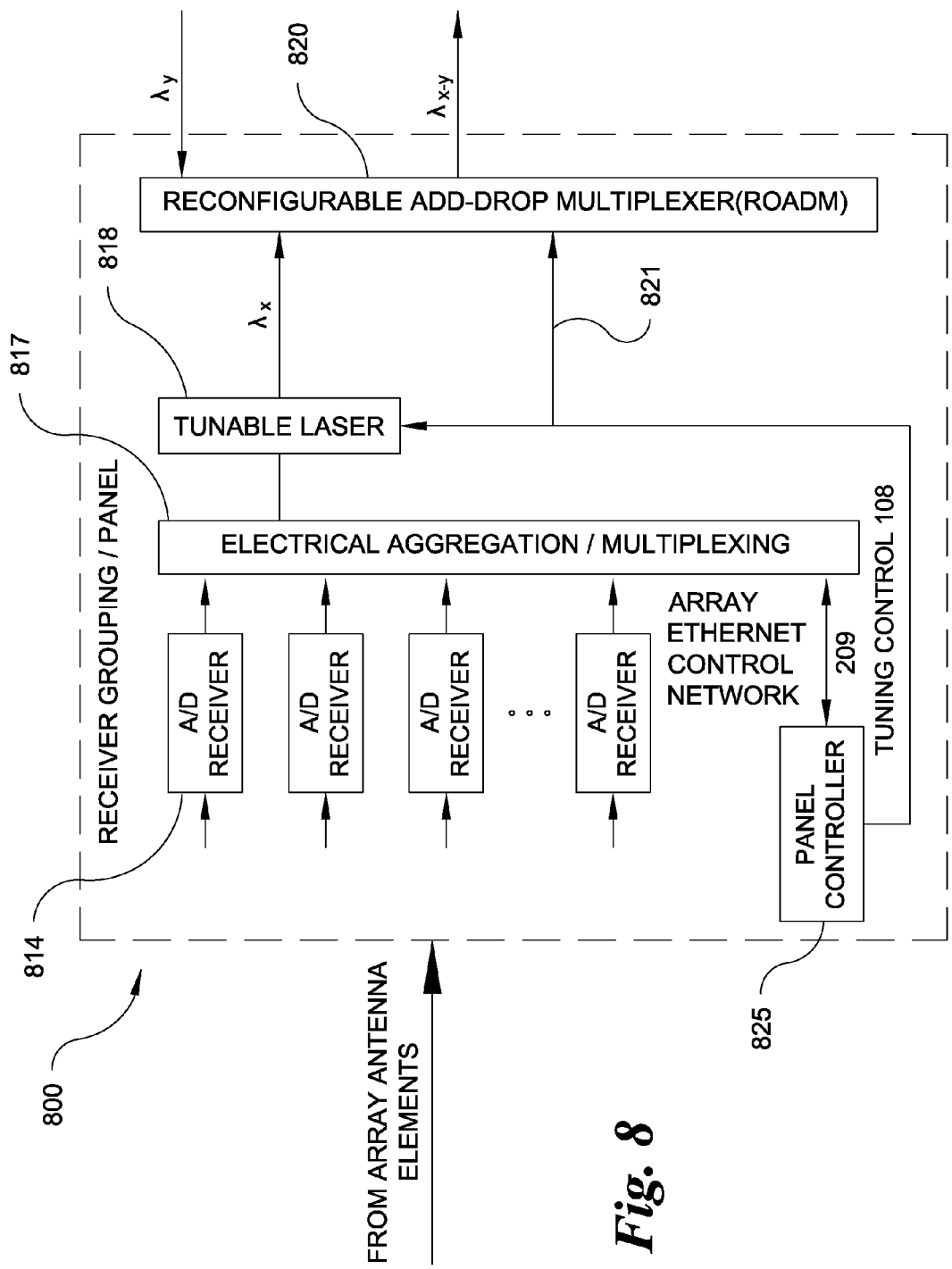
FIG. 8 illustrates an electrical aggregation multiplexing and reconfigurable add/drop multiplexer according to an embodiment of the invention.

FIG. 8 illustrates a panel A/D grouping subsystem 800 of receiver modules 814 according to an embodiment of the invention. The receiver 814 signals from an antenna processor operates substantially equivalent to the apparatus described in connection with FIG. 6. The combined or multiplexed signals from electrical aggregation multiplexer 817 serve as input to a tunable laser 818. The output of the tuned laser 818 feeds an ROADM 820 integrated into the panel 800. A tuning control signal 821 sets the wavelength of the input $\lambda_x$ from the tunable laser 818.

Figure 9:
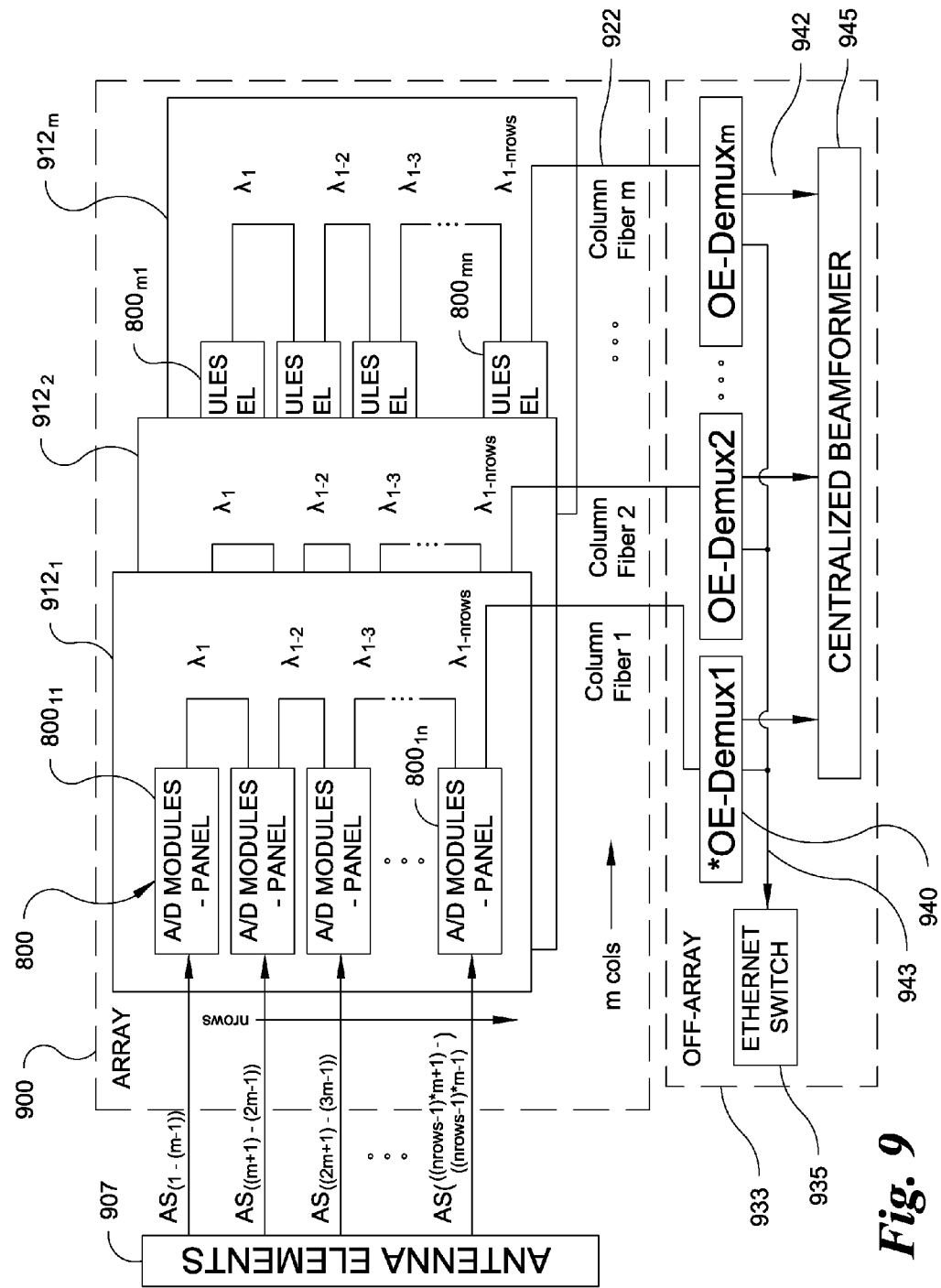
FIG. 9 illustrates a receiver panel grouping electrical aggregation multiplexing and reconfigurable add/drop multiplexer according to an embodiment of the invention.

FIG. 9 illustrates an architecture 900 for electrical aggregation multiplexing and ROADM multiplexing according to an embodiment of the invention utilizing the panel grouping subsystem 800 of FIG. 8. The architecture 900 is comprised of m columns panels $\mathbf{912}_1$ through $\mathbf{912}_m$ that receive antenna element 907 input. Each A/D module $\mathbf{800}_{11}$ through $\mathbf{800}_{mn}$ performs functionally equivalent to the panel arrangement 800 described in connection with FIG. 8. The A/D modules $\mathbf{800}_{12}$ through $\mathbf{800}_{mn}$ receive inputs from the outputs of preceding A/D modules $\mathbf{800}_{11}$ through $\mathbf{800}_{mn-1}$ respectively, effectively multiplexing the tuned lasers (tuned via control signal 821) at wavelengths $\lambda_1$ through $\lambda_{nrows}$ (e.g. where $\lambda_{1-2}$ represents $\lambda_{1,2}$; $\lambda_{1-3}$ represents $\lambda_{1,2,3}$, and so on). Each panel $\mathbf{912}_1$ through $\mathbf{912}_m$ passes the multiplexed signal to an off array processing module 933 over fiber transmission line 922 designated fiber$_1$ through fiber$_m$ comprised of columns of corresponding opto-electronic demultiplexers 940 designated OE-Demux$_1$ through OE-Demux$_m$ (where m designates the number of columns) whose outputs $\mathbf{942}_1$ through $\mathbf{942}_m$ provide input to a centralized beamformer 945. Ethernet switch 935 receives the corresponding control data 943 and controls processing between the array/antenna and the central radar control computer (not shown).

Figure 10:
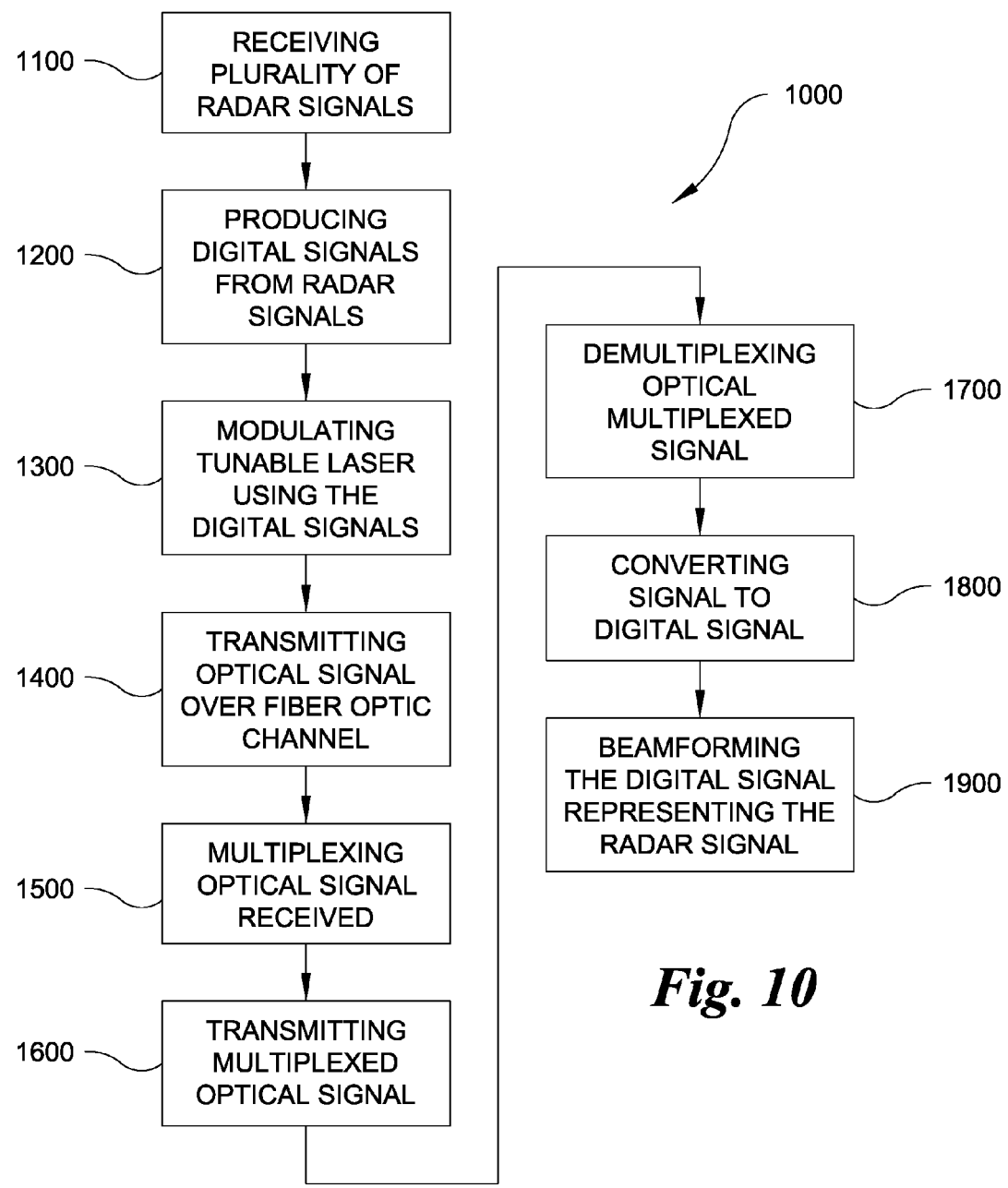
FIG. 10 is a flow chart of a process for using a tunable laser, multiplexing, demultiplexing and beamforming a radar signal according to an embodiment of the invention.

As shown in FIG. 10, the invention herein also relates to a process 1000 for receiving 1100 at an antenna array a plurality of radar signals; producing 1200 a plurality of corresponding digital signals; modulating 1300 a tunable laser using the digital signals to produce modulated optical signals at one or more associate wavelengths; transmitting 1400 the modulated optical signals over a fiber optic transmission channel; optically multiplexing 1500 the modulated optical signals; transmitting 1600 the multiplexed modulated optical signals; to an optical demultiplexer located remote from the array; demultiplexing 1700 the optical signals and converting 1800 to a digital electrical signal and beamforming 1900 using the digital signal representing the received radar signal.

The invention is further embodied in a means for receiving a plurality of radar signals; means for producing a plurality of corresponding digital signals; means for modulating a tunable laser using the digital signals to produce a modulated optical signal at one or more associate wavelengths; means for transmitting the modulated optical signal over a fiber optic transmission channel; means for optically multiplexing the modulated optical signal; means for transmitting the multiplexed modulated optical signal to an optical demultiplexer; means for demultiplexing the optical signal; means for converting the signal to a digital signal; and means for beamforming using the digital signal representing the received radar signal.

With reference to FIG. 1 through FIG. 10, it is understood that the processing and associated processors used in converting the analog signals from the antenna processor to digital signals and the generation of control signals can be implemented in hardware, software, firmware, or combinations thereof. It is also to be appreciated that, where the functionality selection is implemented in either software, firmware, or both, the processing instructions can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. Generally the software processes may exist in a variety of forms having elements that are more or less active or passive. For example, they may exist as software program(s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals are signals that a computer system hosting or running the computer program may be configured to access, including signals downloaded through the Internet or other networks. Examples of the foregoing include distribution of the program(s) on a CD ROM or via Internet download.

Thus, in one embodiment the present invention describes an antenna system with tunable optical modulators followed by a DWDM to transport radar data from on-array post A/D conversion receiver modules to an off-array location(s) for signal processing. A tunable optical laser, used at each receiver output, is connected to the array electronics control system for setting of the wavelength to be used in the modulator. Using optical tunable lasers minimizes the part count by allowing each receiver or set of receivers to be tuned and multiplexed while having a single part number/type. Utilizing fixed transceivers would require separate parts for each wavelength to be multiplexed adding to system complexity, procurement costs, and maintenance costs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A radar array antenna apparatus comprising:
   a plurality of analog to digital (A/D) converters for converting analog signals indicative of radar return data from the array to digital signals;
   one or more optical modulators coupled to said A/D converters for receiving said digital signals, said optical modulators having controllable wavelengths;
   wherein each optical modulator is connected to a multiplexer, said multiplexer providing outputs via a corresponding optical medium to a corresponding demultiplexer that distributes the signals to a beamformer.

2. The apparatus of claim 1, wherein said multiplexer is a dense wavelength division multiplexer.

3. The apparatus of claim 1, wherein said multiplexer is an electrical aggregation multiplexer.

4. The apparatus of claim 1, wherein said plurality of A/D converters and optical modulators are disposed on said array, and wherein said array further comprises:
   a controller that outputs array control information;
   an optical modulator coupled to said controller for providing to said multiplexer said array control information for transmission over said optical medium to said demultiplexer; and
   a switch coupled to said demultiplexer for conveying said array control information to a central controller.

5. The apparatus of claim 4, wherein the optical modulators feed a dense wavelength division multiplexer.

6. The apparatus of claim 1, wherein said multiplexer is a reconfigurable add/drop multiplexer.

7. The apparatus of claim 6, wherein the reconfigurable add/drop multiplexer feeds a dense wavelength division demultiplexer.

8. The apparatus of claim 1, wherein the demultiplexer is a dense wavelength division demultiplexer.

9. The apparatus of claim 1, wherein the demultiplexer is an opto-electronic demultiplexer.

10. The apparatus of claim 1, wherein said optical medium comprises one or more optical fibers.

11. The apparatus of claim 10, wherein said corresponding demultiplexer is remote from said array.

12. A radar array antenna system comprising:
    an antenna array having a plurality of antenna elements that provide analog data indicative of received radar return signals;
    a plurality of A/D converters responsive to said analog data for converting said analog data to digital signals;
    one or more optical modulators having controllable wavelengths and responsive to said A/D converters for providing said digital signals at selected wavelengths according to a control signal; and
    a multiplexer coupled to the output of said one or more optical modulators for providing multiplexed digital signals to a corresponding demultiplexer to form a radar beam.

13. The system of claim 12, further comprising an optical modulator having controllable wavelengths and responsive to said controller for conveying array control information at a selected wavelength for input to said multiplexer.

14. The system of claim 12, wherein said A/D converters and said optical modulators are configured in a series of panel groups, each said panel group providing a digital output signal and a control signal at a different wavelength to a dense wavelength division multiplexer.

15. The system of claim 14, further comprising a fiber optic connection between said multiplexer and said demultiplexer for carrying said digital signal data and said control information.

16. A radar array antenna comprising:
    an antenna receiver for receiving analog radar signal data;
    an A/D converter assembly responsive to said analog radar signal data for producing a plurality of corresponding digital signals;
    means for modulating a tunable laser using the digital signals to produce one or more modulated optical signals at one or more associated wavelengths, the modulated optical signals being transmitted over one or more fiber optic transmission channels;
    a multiplexer responsive to the one or more optical modulated signals at one or more associated wavelengths for optically multiplexing the modulated optical signals onto a single fiber optic channel;
    a demultiplexer coupled to said multiplexer via said single fiber optic channel for demultiplexing the multiplexed modulated optical signals to produce corresponding digital signals;
    a beamformer coupled to said demultiplexer for beamforming using the corresponding digital signals representing the received radar signal to provide a beamformed output.

17. A method for receiving analog signals output from antenna elements constituting an antenna array and processing said analog signal to obtain beamformed data, the method comprising:
    receiving in said array a plurality of analog radar signals;
    converting in said array said analog radar signals to corresponding digital signals;
    modulating in said array a tunable laser outputting a waveform at one or more selected wavelengths using the digital signals to produce a modulated optical data signal at said one or more selected wavelengths;
    transmitting the modulated optical data signal over a fiber optic transmission channel;
    optically multiplexing the modulated optical data signal;
    transmitting the multiplexed modulated optical data signal over a fiber optic transmission channel to an optical demultiplexer;
    demultiplexing the optical data signal and converting the signal to a digital signal; and
    beamforming using the digital signal representing the received radar signal to obtain beamformed data.

18. The method of claim 17, further comprising tuning said tunable laser to a selected wavelength.

19. The method of claim 17, wherein said demultiplexing and beamforming are performed remote from said array.

20. The method of claim 19, further comprising modulating in said array a tunable laser outputting a waveform at one or more selected wavelengths using control signal information to produce a modulated optical control signal at said one or more selected wavelengths; and transmitting the modulated optical control signal over said fiber optic transmission channel for multiplexing with the modulated optical data signal.

* * * * *